United States Patent Office 3,278,369
Patented Oct. 11, 1966

3,278,369
DIMETHYLDICHLOROVINYL PHOSPHATE COMPOSITIONS STABILIZED WITH CARBOXYLIC ACID ANHYDRIDES
Marc Haering, Zofingen, Switzerland, assignor to Ciba Limited, Basel, Switzerland, a Swiss company
No Drawing. Filed Nov. 15, 1963, Ser. No. 323,903
Claims priority, application Switzerland, Nov. 16, 1962, 13,453/62; Jan. 23, 1963, 788/63; Mar. 28, 1963, 3,960/63
4 Claims. (Cl. 167—22)

It is known that pesticidal preparations containing biocidal organic phosphoric acid esters, for example dimethyldichlorovinyl phosphate or a derivative thereof as active principle, and finely dispersed silicic acid as vehicle or a dispersing or emulsifying agent gradually lose their activity, for example on being stored. The possibility of extending the active life of such preparations is therefore a problem of considerable practical importance.

The present invention provides a process for improving the stability and extending the active life of a pesticidal preparation containing a biocidal organic ortho-phosphoric acid ester or phosphonic acid ester or a thio-analogue of one of these esters, more especially dimethyldichlorovinyl phosphate or a derivative thereof, as active principle, together with finely dispersed silicic acid as vehicle or a dipsersing or emulsifying agent, wherein (A) The silicic acid vehicle is mixed, before or while or after having been mixed with the active principle, with one or more compounds belonging to the following groups, preferably to group (b):

(a) Ammonia, hydrazine, a primary, secondary or tertiary aliphatic or aromatic amine compound, a heterocyclic (preferably saturated) 5- or 6-membered nitrogen compound, a preferably aliphatic or aromatic acid amide, an oxime, an aromatic urea derivative,
(b) An anhydride of an organic monocarboxylic or dicarboxylic acid and, if desired, the substances listed under (a) or (b), provided they have been added to the vehicle before admixture with the active principle, are removed to a large extent, preferably to an extent of at least 90 to 99.5%, from the vehicle by heating, advantageously to 100 to 150° C. and/or under reduced pressure, preferably from 50 to about 100 mm. Hg, whereupon the vehicle pretreated in this manner is mixed with the active principle, or (B) The dispersing or emulsifying agent is mixed with an anhydride of an organic monocarboxylic or dicarboxylic acid before, while or after having been mixed with the active principle.

According to a preferred variant of carrying out the present invention, for example, the finely dispersed silicic acid vehicle is mixed, before being mixed with the active principle, with one or more compounds from the following groups, preferably from group (b):

(a) Ammonia, hydrazine, piperidine, triethylamine, aniline, N:N-dimethylaniline, ethylenediamine, phenylurea, salicylaldoxime, salicylic acid amide, 2-nitrodiphenylamine, or with one or more compounds from the following group:
(b) Maleic, itaconic, acetic, propionic, butyric, succinic, glutaric, phthalic or benzoic acid anhydride, said compounds, if desired, then being removed to a large extent, preferably to an extent of at least 90 to 95%, from the vehicle by heating, preferably at 100 to 150° C. and/or under reduced pressure, preferably under about 100 mm. Hg, whereupon the vehicle thus pretreated is mixed with the active principle.

The reduced pressure applied during the removal of the additives from the vehicle may, of course, be varied within relatively wide limits, for example between 10 and 150 mm. Hg.

According to another preferred variant of the present process, the finely dispersed silicic acid vehicle is mixed simultaneously with the active principle and with a compound from the following group:

(a) Phenylurea, salicylaldoxime, salicylic acid amide, or with one or more compounds from the following group, preferably from group (b):
(b) Maleic, itaconic, acetic, propionic, butyric, succinic, glutaric, phthalic or benzoic acid anhydride.

In the latter case it is especially advantageous to add the substances listed under (a) and (b) in the form of a solution in, or a mixture with, the active principle.

When a reactive phosphorus compound of the kind defined above, for example dimethyldichlorovinyl phosphate, is used as active principle in a pesticidal preparation of which the stability is to be improved and the active life is to be extended, there may, of course, be used for the simultaneous addition of the active principle and activity extenders to the vehicle only those which do not react with the active principle.

According to another preferred variant of carrying out the present invention, the dispersing or emulsifying agent, before, while or after being mixed with the active principle, is mixed with an anhydride of an organic monocarboxylic or dicarboxylic acid, preferably maleic, itaconic, propionic, butyric, glutaric, phthalic, benzoic or especially acetic acid anhydride and, if desired, with an organic solvent that is inert towards the active principle.

The present invention relates more especially to the extension of the active life of pesticidal preparations of the kind defined above that contain as active principle a compound of one of the following formulae:

$$\begin{array}{c} R-X \\ \diagdown \\ R'-X' \end{array} \!\!\! \begin{array}{c} O \\ \| \\ P-O-C=C \end{array} \!\!\! \begin{array}{c} R'' \\ | \\ \diagup \end{array} \!\!\! \begin{array}{c} Hal \\ \diagdown \\ Hal \end{array}$$

or $$\begin{array}{c} R-X \\ \diagdown \\ R'-X' \end{array} \!\!\! \begin{array}{c} O \\ \| \\ P-O-C=C \end{array} \!\!\! \begin{array}{c} R'' \\ | \\ \diagup \end{array} \!\!\! \begin{array}{c} Hal \\ \diagdown \\ Hal \end{array}$$

(I)

in which R and R' each represents an alkyl radical having 1 to 5 carbon atoms, R" represents a hydrogen atom or a methyl group, and X and X' each stands for oxygen or sulfur and Hal for a halogen atom, preferably a chlorine or bromine atom, especially dimethyldichlorovinyl phosphate (DDVP), or diethyldichlorovinyl phosphate, di-n-propyl- or di-isopropyldichlorovinyl phosphate; di-secondary butyl-dichlorovinyl phosphate, di-n-butyl-dichlorovinyl phosphate, di - amyl - dichlorovinyl phosphates, dimethyl- and diethyldibromo-vinyl phosphate, methylethyl-dichlorovinyl phosphate; furthermore esters that can be derived from the above formula by saturating the double bond with halogen atoms, for example the bromination product of DDVP, or dimethyl-1:2-dibromo-2:2-dichloroethyl phosphate;

(II)

$$\begin{array}{c} CH_3O \\ \diagdown \\ CH_3O \end{array} \!\!\! \begin{array}{c} \\ P-O-C \\ \| \\ O \end{array} \!\!\! \begin{array}{c} CH_3 \\ | \\ CCl \\ | \\ C-N \\ \| \\ O \end{array} \!\!\! \begin{array}{c} \\ \\ C_2H_5 \\ \diagdown \\ C_2H_5 \end{array}$$

(III)    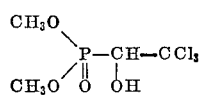

As further vehicles and additives that can be mixed according to this invention additionally to finely dispersed silicic acid with the selected volatile organic phosphorus compound referred to above, there may be mentioned: Antioxidants, dispersants, emulsifiers, wetting agents and organic solvents, especially those which boil above 100° C.

As antioxidants that may be present as further ingredients of the preparations improved according to this invention, there may be mentioned the conventional aliphatic and aromatic oxidation inhibitors, for example 1:2-propyleneglycol, 2:6-di-tertiary butylphenol, 2:6-di-tertiary butyl-para-cresol, butylhydroxyanisole, bis-(3:5-di-tertiary butyl-4-hydroxyphenyl)-methane, 3:5-di-tertiary butyl-4-hydroxybenzyl alcohol, 3:5-diisopropyl-4-hydroxybenzyl alcohol; also simpler phenolic compounds, for example hydroquinone, resorcinol or pyrogallol; furthermore para-tertiary butylpyrocatechol or gallic acid esters, more especially gallic acid ethyl ester.

As emulsifiers or dispersants that may be present as a further ingredient in the preparations improved according to this invention, there are suitable non-ionic products, for example condensation products of ethylene oxide with aliphatic alcohols, amines or carboxylic acids containing a longchain hydrocarbon radical having about 10 to 30 carbon atoms, for example the condensation product of octadecyl alcohol with 25 to 30 mols of ethylene oxide, or of commercial oleylamine with 15 mols of ethylene oxide, or of dodecylmercaptan with 12 mols of ethylene oxide. From among suitable anionic emulsifiers, there may be mentioned the sodium salt of dodecyl alcohol sulfuric acid ester, the sodium salt of dodecylbenzenesulfonic acid, the potassium salt of triethanolamine salt of oleic or abietic acid or of mixtures of these two acids, or the sodium salt of a petroleumsulfonic acid.

As organic solvents the preparations improved according to this invention may contain, for example, petroleum fractions having a high to medium boiling range (more especially above 100° C.), such as diesel oil or kerosene, also coal tar oil or oils of vegetable or animal origin, as well as cyclic hydrocarbons such as alkylated naphthalenes, tetrahydronaphthalene; furthermore xylene mixtures and, if desired, additionally ketones, esters chlorinated hydrocarbons such as tetrachloroethane, trichloroethylene or trichlorobenzenes and tetrachlorobenzenes.

For use as scattering or dusting agents the preparations improved by the present process may contain as further additives solid vehicles, for example talcum, kaolin, bentonite, cork meal and wool meal and other materials of vegetable origin. It is also of great advantage to manufacture the preparations in granular form.

Apart from the acid anhydrides mentioned above there may be used as acid anhydrides additives also mixed acid anhydrides, for example the following:

CH₃CO—O—COC₂H₅ (acetic/propionic acid anhydride)
CH₃CO—O—CO—C₆H₅ (acetic/benzoic acid anhydride)
CH₃CO—O—COOC₂H₅ (mixed anhydride of acetic acid and carbonic acid monoethyl ester)
C₂H₅OOC—O—COOC₂H₅ [pyrocarbonic acid ethyl ester (anhydride of carbonic acid monoethyl ester)]

Examples of further suitable acid anhydride additives are crotonic acid anhydride and the following compounds

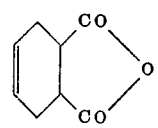

Δ⁴-tetrahydrophthalic acid anhydride

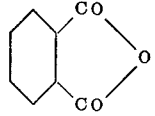

Hexahydrophthalic acid anhydride

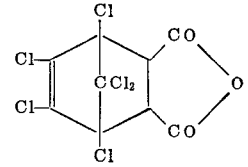

3:4:5:6 - tetrachloro-3:6-endodichloro - methylene-Δ⁴-tetrahydrophthalic acid anhydride (Diels-Alder adduct of hexachlorocyclopentadiene and maleic acid anhydride)

The preparations improved according to this invention may be used in general pest control, in plant protection and in hygiene, for example to combat harmful insects, acarides, nematodes and molluscs. The new preparations, in particular those which contain as active principle a homologue of DDVP, are also suitable as anthelmintics.

The preparations improved according to this invention are further distinguished by an especially favourable ratio of (a) the effect on pests to (b) the toxicity towards warm-blooded animals. They act against the various stages of development of insects and acarides, such as the eggs, larvae and imagines, both as contact and stomach poisons.

Additionally to the process described above the present invention also provides pest control preparations having an improved stability and a prolonged active life as such, containing a mixture of (A) A biocidal organic phosphorus compound of the kind defined above, more especially dimethyldichlorovinyl phosphate or a homologue thereof as active principle, and (B) A vehicle containing finely dispersed silicic acid, which has been mixed before, while or after being mixed with the active principle with one or more than one compound from the following groups, preferably from group (b):

(a) Ammonia, hydrazine, a primary, secondary or tertiary aliphatic or aromatic amine compound, a heterocyclic (preferably saturated) 5- or 6-membered nitrogen compound, an aliphatic or aromatic acid amide, an oxime, an aromatic urea derivative, (b) An anhydride of an organic monocarboxylic or dicarboxylic acid, and, if desired, the substances listed under (a) or (b), provided they have been added to the vehicle before admixture with the active principle, are removed to a large extent, preferably to an extent of at least 90 to 99.5%, from the vehicle by heating, advantageously to 100 to 150° C. and/or under reduced pressure, preferably from 50 to 100 mm. Hg, whereupon the vehicle treated in this manner is mixed with the active principle, or (C) With a dispersant or emulsifier, an anhydride of an organic monocarboxylic or dicarboxylic acid, preferably with acetic anhydride, and, if desired, with an organic solvent that is inert towards the active principle. As a preferred form there may be mentioned: Stable, liquid, emulsifiable concentrates of pesticides containing as active principle dimethyldichlorovinyl phosphate or a homologue thereof, as well as a dispersant or emulsifier, an anhydride of an organic monocarboxylic or dicarboxylic acid, preferably acetic anhydride, and if desired an organic solvent that is inert towards the active principle, preferably one that boils above 100° C.

As the finely dispersed silicic acid vehicle there may be used with special advantage a silica gel such, for example, as has been described in Kirk-Othmer, Encyclopaedia of Chemical Technology, volume 12, pages 346–347, as "silica gel of low density" having a specific gravity of 0.37 to 0.43, containing 99.6% of $SiO_2$ and having an average pore diameter of 100 to 150 Angstroem.

The following examples illustrate the invention. The parts and percentages mentioned are by weight.

EXAMPLE 1

(a) 100 g. of finely dispersed silicic acid (marketed under the trade name "Hi-Sil"; containing about 6% of water) were mixed with ammonia gas, until a weight increase of 3 g. had been attained.

(b) 100 g. of the silicic acid described under (a) above ["Hi-Sil," trademark] were mixed with 5 g. of hydrazine hydrate.

(c) 100 g. of the silicic acid defined above under (a) ["Hi-Sil," trademark] were mixed with 5 g. of piperidine.

The above mixtures (a) to (c) were heated at a temperature ranging from about 100 to 150° C., preferably 100 to 130° C., under a reduced pressure of about 100 mm. Hg, until about 90 to 99.5% of the additive concerned had been removed again. 3 g. of each of the silicic acid vehicle thus pretreated were then mixed with 4 g. of dimethyldichlorovinyl phosphate, and kept for 31 days at 20, 35 and 50° C. respectively in screw top bottles. The percentual loss of the preparations (a), (b) and (c) of dimethyldichlorovinyl phosphate was then determined. As comparative substance K there was used a mixture, stored under identical conditions, of 3 g. of the silicic acid vehicle described under (a) ["Hi-Sil," trademark], with 4 g. of dimethyldichlorovinyl phosphate, which vehicle had however not been pretreated by the addition of ammonia or another compound.

The result of the experiment is shown in the following table:

*Table 1*

| Compound used for pretreating the silicic acid vehicle | Loss of active principle in percent after 31 days' storage at— | | |
|---|---|---|---|
| | 20° C. | 35° C. | 50° C. |
| K | 28.3 | 51.9 | 61.5 |
| (a) Ammonia | 0.8 | 16.4 | 52.3 |
| (b) $NH_2$—$NH_2$.$H_2O$ | 6.0 | 24.0 | 53.4 |
| (c) Piperidine | 2.4 | 19.3 | 52.7 |

(d) 50 g. of the silicic acid described above under (a) ["Hi-Sil," trademark] were mixed with a solution of 5 g. of phenylurea in 50 g. of dimethyldichlorovinyl phosphate.

(e) 45 g. of the silicic acid described above under (a) ["Hi-Sil," trademark] were mixed with a solution of 3 g. of 2-nitrodiphenylamine in 45 g. of dimethyldichlorovinyl phosphate.

(f) 45 g. of the silicic acid described above under (a) ["Hi-Sil," trademark] were mixed with a solution of 2.5 g. of salicylaldoxime in 47.5 of dimethyldichlorovinyl phosphate.

(g) 45 g. of silicic acid described above under (a) ["Hi-Sil," trademark] were mixed with a solution of 2.5 g. of salicyclic acid amide in 47.5 g. of dimethyldichlorovinyl phosphate.

The specimens (d) to (g) thus prepared were stored for 31 days at 20, 35 and 50° C. in screw top bottles. The percentage loss of the preparations (d) to (g) of dimethyldichlorovinyl phosphate was then determined. As comparative substance K there was used a mixture, stored under identical conditions, of 3 g. of the silicic acid vehicle described above under (a) ["Hi-Sil," trademark] pretreated with 4 g. of dimethyldichlorovinyl phosphate, but not with addition of another compound. The result of the experiment is shown in the following table:

*Table II*

| Compound used for pre-treating the silicic acid vehicle | Loss of active principle in percent after 1 month's storage at— | | |
|---|---|---|---|
| | 20° C. | 35° C. | 50° C. |
| K | 28.3 | 51.9 | 67.5 |
| (d) Phenylurea | 5.0 | 20.0 | 48.5 |
| (e) 2-nitrodiphenylamine | 6.3 | 17.8 | 44.3 |
| (f) Salicylaldoxime | 3.6 | 21.5 | 48.3 |
| (g) Salicylic acid amide | 8.6 | 20.1 | 68.3 |

(h) 20 g. of "Hi-Sil" [trademark] were mixed with 2 g. of ethylenediamine, kept for several hours, then dried at 120–130° C. under 50 to 80 mm. Hg pressure for 15 hours, left for one day exposed to air, then mixed with 23 g. of dimethyldichlorovinyl phosphate (DDVP) and finally stored for 31 days at 35° C. in a screw top bottle. The analysis of the initial and final contents was performed iodometrically.

(i) A mixture of 20 g. of "Hi-Sil" [trademark] and 2 g. of aniline was left to itself for a few hours, then dried at 120–130° C. under 50 to 80 mm. Hg pressure for 15 hours, left to itself for one day exposed to air, then mixed with 23 g. of dimethyldichlorovinyl phosphate (DDVP) and finally stored for 31 days at 35° C. in a screw top bottle. The analysis of the initial and final contents was performed iodometrically.

(k) A mixture of 20 g. of "Hi-Sil" [trademark] and 2 g. of triethylamine was left to itself for a few hours, then dried at 120–130° C. under 50–80 mm. Hg pressure for 15 hours, left to itself for one day exposed to air, then mixed with 23 g. of dimethyldichlorovinyl phosphate and finally stored for 31 days at 35° C. in a screw top bottle. The analysis of the initial and final contents was performed iodometrically. As comparative substance K there was used a mixture, stored under identical conditions, of 3 g. of the silicic acid vehicle described above under (a) ["Hi-Sil," trademark] with 4 g. of dimethyldichlorovinyl phosphate which, however, had not been pretreated by adding another compound. The result is shown in the following table:

*Table IIa*

| Compound used for pre-treating the silicic acid vehicle | Loss of active principle in percent after 1 month's storage at 35° C. |
|---|---|
| K | 52.7 |
| (h) Ethylenediamine | 18.2 |
| (i) Aniline | 27.7 |
| (k) Triethylamine | 18.3 |

Similar results were achieved by using as silicic acid vehicle one of the products marketed under the trade names "Aerosil" or "Zeosil."

EXAMPLE 2

Five mixtures were prepared, each containing 4 g. of dimethyldichlorovinyl phosphate and 1 g. of the following compounds:

(a) Maleic acid anhydride
(b) Phthalic acid anhydride
(c) Benzoic acid anhydride
(d) Acetic acid anhydride
(e) Succinic acid anhydride The mixtures (a), (c) and (d) were obtained in the form of solutions, whereas compounds (b) and (e) formed mixtures.

The resulting solutions and mixtures respectively (5 g. each) were each mixed with 3 g. of finely dispersed silicic acid ("Hi-Sil," trademark; containing about 6% of water), fused in ampoules and stored for 31 days at 20, 35 and 50° C., whereupon the percentual loss of the preparations (a) to (e) of dimethyldichlorovinyl phosphate was determined.

As comparative substance K there was used a mixture, stored under identical conditions, of 3 g. of the silicic acid vehicle described above ["Hi-Sil," trademark] which had been mixed with 4 g. of dimethyldichlorovinyl phosphate but not with an acid anhydride or another compound. The result is shown in the following table:

*Table III*

| Anhydride, present in the solution or mixture respectively, added to the silicic acid vehicle | Loss of active principle in percent after 1 month's storage at— | | |
|---|---|---|---|
| | 20° C | 35° C | 50° C |
| K | 18.7 | 28.3 | 44.1 |
| (a) Maleic acid anhydride | 10.5 | 10.5 | 24.4 |
| (b) Phthalic acid anhydride | 6.4 | 6.9 | 26.6 |
| (c) Benzoic acid anhydride | 19.6 | 23.1 | 33.9 |
| (d) Acetic acid anhydride | 0 | 3.2 | 8.2 |
| (e) Succinic acid anhydride | 6.2 | 4.9 | 15.9 |

Similarly good results were achieved when, instead of adding one of the anhydrides (a) to (e) to the silicic acid vehicle together with dimethyldichlorovinyl phosphate, the acetic anhydride—before admixture with dimethyldichlorodivinyl phosphate—was mixed with the finely powdered silicic acid vehicle and then about 90 to 99.5% of the compound added was removed again by heating the vehicle+anhydride mixture at 100 to 150° C. under a reduced pressure of about 100 mm. Hg.

EXAMPLE 3

(A)(a) A mixture was prepared from 525 g. of dimethyldichlorovinyl phosphate, 80 g. of an emulsifier consisting of a mixture of non-ionic and anionic surface-active substances ["Toximul P," trademark; makers Ninol Corp., Chicago, U.S.A.] and 541 g. of dioctylphthalate. 100 g. of this mixture were stored for 3 months at 35° C. in a stoppered polyethylene bottle. Loss of active principle after this period: 12%.

(b) 95 g. of a mixture of the composition described under A(a) was mixed with 5 g. of acetic anhydride and stored under identical conditions as described under A(a). Loss of active principle after 3 months: 0.7%.

(c) A mixture of 95 g. of the composition defined under A(a) was mixed with 5 g. of maleic anhydride and stored under identical condition as described under A(a). Loss of active principle after 3 months: 6.7%.

(B)(a) A mixture was prepared from 1050 g. of dimethyldichlorovinyl phosphate, 100 g. of the emulsifier described under (A)(a) and 163 g. of dioctylphthalate and stored under the conditions described under A(a). Loss of active principle after 3 months: 8.8%.

(b) 95 g. of a mixture of the composition described under B(a) were mixed with 5 g. of acetic anhydride and stored as described under A(a). Loss of active principle after 3 months: nil.

(c) 95 g. of a mixture of the composition defined under B(a) were mixed with 5 g. of maleic anhydride and stored as described under A(a). Loss of active principle after 3 months: 2.6%.

(C)(a) A mixture was prepared from 525 g. of dimethyldichlorovinyl phosphate, 80 g. of an emulsifier consisting of a mixture of the calcium or magnesium salt of monolauryl-benzene-monosulfonic acid and the polyethyleneglycol ether of sorbitanmonolaurate, 20 g. of an emulsifier consisting of a mixture of a non-ionic and an anionic surface-active compound ("Toximul Q," trademark; makers Ninol Corp., Chicago, U.S.A.), 525 g. of a hydrocarbon mixture consisting of unsaturated aromatics (petroleum extract) which begins to boil at 320° C. and has a flash point of 154° C. ("Dutrex 3 Sp," trademark; makers Shell), and the mixture thus prepared was stored under the conditions described under A(a). Loss of active principle after 3 months: 14.9%.

(b) 95 g. of a mixture composed as described under C(a) were mixed with 5 g. of acetic anhydride and stored as described under A(a). Loss of active principle after 3 months: 7.1%.

(c) 95 g. of a mixture composed as described under C(a) were mixed with 5 g. of maleic anhydride and stored as described under A(a). Loss of active principle after 3 months: 7.1%.

(D)(a) A mixture was prepared from 1050 g. of dimethyldichlorovinyl phosphate, 80 g. of an emulsifier consisting of a mixture of the calcium or magnesium salt of monolauryl-benzene-monosulfonic acid and the polyethyleneglycol ether of sorbitan-monolaurate, 20 g. of an emulsifier consisting of a mixture of a non-ionic and an anionic surface-active compound ("Toximul Q," trademark, makers Ninol Corp., Chicago, U.S.A.), 164 g. of a hydrocarbon mixture consisting of unsaturated aromatics (petroleum extract) which begins to boil at 320° C. and has a flash point of 154° C. ("Dutrex 3 Sp," trademark; makers Shell), and the mixture thus prepared was stored as described under A(a). Loss of active principle after 3 months: 5.2%.

(b) 95 g. of a mixture composed as described under D(a) were mixed with 5 g. of acetic anhydride and stored as described under A(a). Loss of active principle after 3 months: 1.4%.

(c) 95 g. of a mixture composed as described under D(a) were mixed with 5 g. of maleic anhydride and stored as described under A(a). Loss of active principle after 3 months: 4.6%.

When itaconic, phthalic, benzoic, propionic or butyric acid anhydride were used under the conditions described under (A) to (D), similarly good results were achieved.

What is claimed is:
1. A pesticidal composition comprising a mixture of (A) a pesticidal amount of dimethyldichlorovinyl phosphate with (B) a surface active material, and (C) at least 0.5% calculated on the weight of component A, of acetic acid anhydride.

2. A pesticidal composition comprising a mixture of (A) a pesticidal amount of dimethyldichlorovinyl phosphate with (B) finely dispersed silicic acid, and (C) at least 0.5% calculated on the weight of component A, of acetic acid anhydride.

3. A pesticidal composition comprising a mixture of (A) a pesticidal amount of dimethyldichlorovinyl phosphate with (B) finely dispersed silicic acid, and (C) at least 0.5% calculated on the weight of component A, of maleic acid anhydride.

4. A pesticidal composition comprising a mixture of (A) a pesticidal amount of dimethyldichlorovinyl phosphate with (B) finely dispersed silicic acid and (C) at least 0.5% calculated on the weight of component A, of phthalic acid anhydride.

References Cited by the Examiner
UNITED STATES PATENTS 2,776,237   1/1957   Clark et al. _____ 167—42
3,097,128   7/1963   Sprinkle et al. _____ 167—22

OTHER REFERENCES

Heath: Organic Phosphorous Poisons, published by Pergamon Press, New York, 1961, pp. 80–82.

LEWIS GOTTS, *Primary Examiner.*

JULIUS LEVITT, ELBERT L. ROBERTS, *Examiners.*

RICHARD L. HUFF, *Assistant Examiner.*

UNITED STATES PATENT OFFICE
CERTIFICATE OF CORRECTION

Patent No. 3,278,369                            October 11, 1966

Marc Haering

It is hereby certified that error appears in the above numbered patent requiring correction and that the said Letters Patent should read as corrected below.

Column 2, lines 45 to 50, the right-hand portion of the formula should appear as shown below instead of as in the patent:

$$C\genfrac{}{}{0pt}{}{\diagup H}{\diagdown Hal}$$

column 7, line 43, for "12%" read -- 12.7% --;

Signed and sealed this 12th day of September 1967.

(SEAL)
Attest:

ERNEST W. SWIDER                           EDWARD J. BRENNER
Attesting Officer                         Commissioner of Patents